July 18, 1950 F. M. LINDLEY ET AL 2,515,561

COMMUNICATIONS MECHANISM

Filed June 21, 1948 4 Sheets-Sheet 1

INVENTOR.
FRANK M. LINDLEY
ROBERT F. RETTER
BY
Joseph A. Rane
ATTY.

COMMUNICATIONS MECHANISM

Filed June 21, 1948

4 Sheets-Sheet 2

INVENTOR.
FRANK M. LINDLEY
ROBERT F. RETTER
BY Joseph A. Rave
ATTY.

COMMUNICATIONS MECHANISM

Filed June 21, 1948 4 Sheets-Sheet 3

INVENTOR.
FRANK M LINDLEY
ROBERT F. RETTER
BY Joseph A. Rave
ATTY.

INVENTOR.
FRANK M LINDLEY
ROBERT F RETTER
BY Joseph A. Rave
ATTY.

Patented July 18, 1950 2,515,561

UNITED STATES PATENT OFFICE 2,515,561

COMMUNICATION MECHANISM

Frank M. Lindley, Cincinnati, and Robert F. Retter, Richland County, Ohio

Application June 21, 1948, Serial No. 34,304

7 Claims. (Cl. 250—6)

This invention relates to improvements in a communication mechanism and particularly to a mechanism for transmitting messages from a plurality of sending points or places to a given receiving point or station.

The invention will be illustrated and described in connection with one of its uses, namely, in connection with a restaurant, eating establishment, or the like. In restaurants, eating establishments, and the like, there are arranged, so called, stations, each station comprising a plurality of places for individual patrons and with each station in charge of a single attendant, waiter or waitress. The kitchen, bar, counter, or the like, from which the station attendant fills the orders of the patrons, is generally remote from the station, thereby requiring the attendant to travel some distance for placing the order and then returning to the station to take care of the needs of new patrons or the wants of the patrons who have given their order and while awaiting the filling of said orders. The attendant must subsequently return to the kitchen, bar, counter or the like to pick up the filled orders for serving same to the patrons.

The present invention contemplates the placing or filling of the patrons' orders without traveling to the kitchen, bar, counter, or the like thereby saving the time involved in order placement and enabling the attendant to more readily and quickly fill the patrons' orders. With a plurality of stations and a plurality of attendants it is necessary that the orders from different station attendants not be confused, which necessitates the several attendants knowing when the channels of communication are clear so as not to attempt to file their order when another order is being placed and this invention contemplates means for preventing this confusion in transmitting and receiving individual orders.

It is therefore the principal object of the present invention to provide a communication system that will enable orders from a plurality of points to be transmitted to a single receiving point without interference with one another and confusion between one another.

Another object of this invention is the provision of a communication mechanism for accomplishing the foregoing object in which subsequent users from remote stations are notified that the mechanism is in use and to transmit their order would result in confusion.

A further object of this invention is the provision of a communication mechanism for transmitting orders from a plurality of separate sending points or stations to a single receiving point and which automatically notifies all sending points or stations when one of the stations or sending points is in operation that the mechanism is in use and for the other stations or sending points to attempt to use the mechanism would result in confusion at the receiving point.

In order to bring into practice the present invention use is made of transportable sending stations which are carried on the person of the attendant. Transportable sending stations, as heretofore known, have required a plurality of batteries with the so called carbon microphones while the batteries may be combined or partially eliminated in the so called crystal microphones but which latter require additional vacuum tubes and auxiliary equipment. These microphones, and the sending stations or transmitters, are therefore relatively heavy and by the present invention there is provided a transmitter or sending station that eliminates one battery or a portion of a combined battery while using the carbon microphone.

It is, therefore, another object of this invention to provide a simplified transmitter or broadcasting set having particular use with the present invention.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings.

Throughout the several views of the drawings similar reference characters are employed to denote the same or similar parts.

Figure 1:
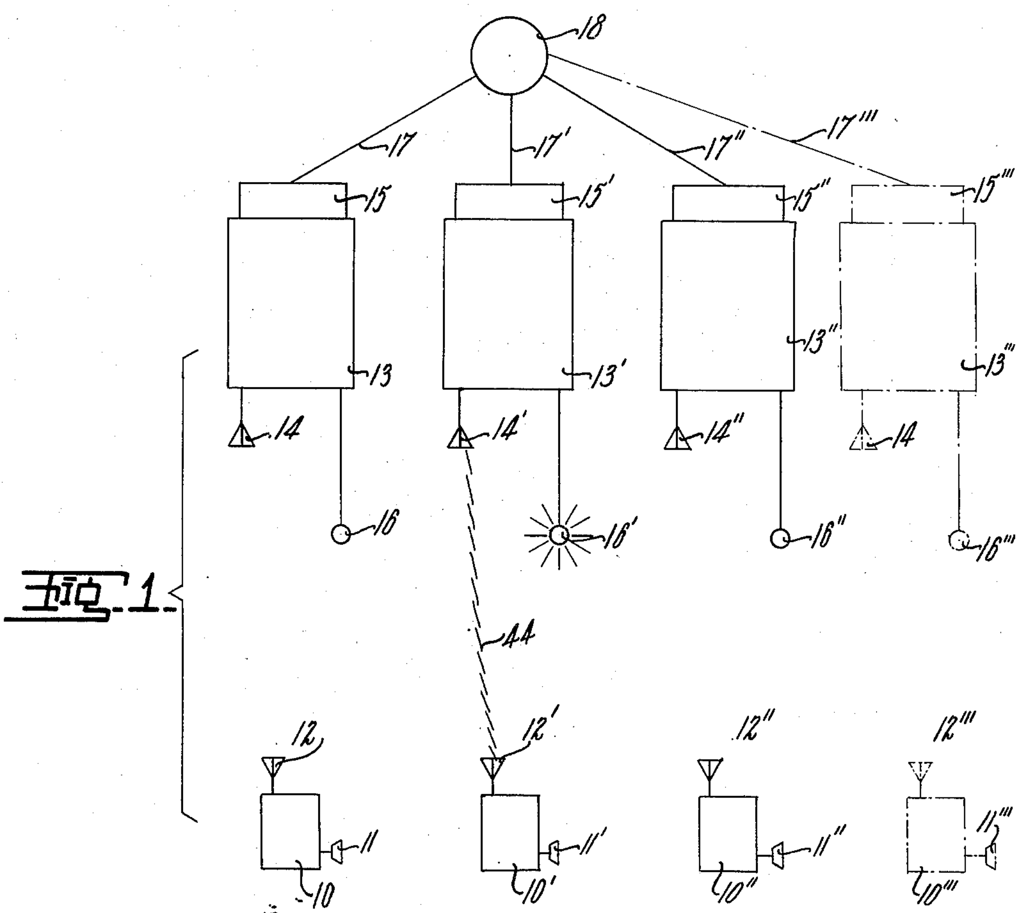
Fig. 1 is a semi-diagrammatic view illustrating the communication mechanism of the present invention.
Figure 2:
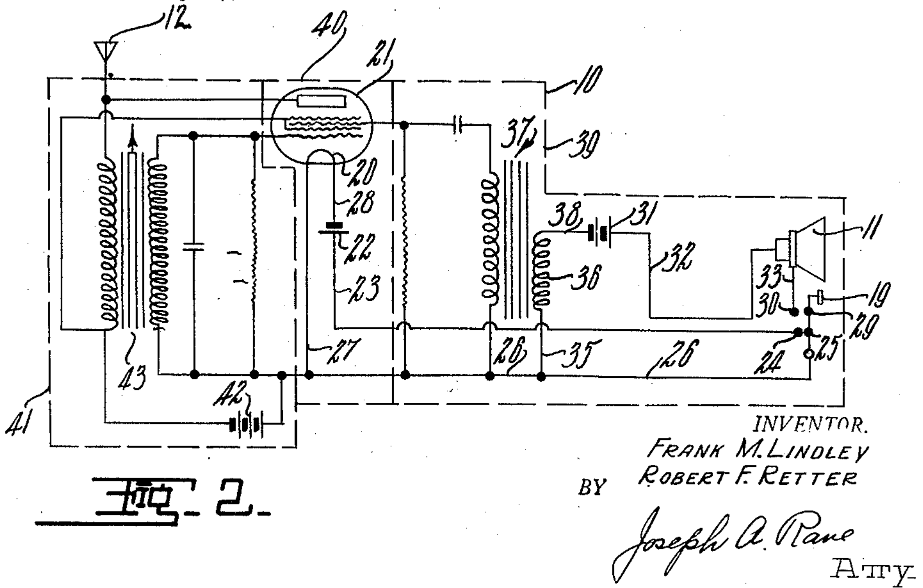
Fig. 2 is a wiring diagram of a sending or transmitting station utilized in carrying forward the invention and of which sending mechanism a plurality are used.
Figure 3:
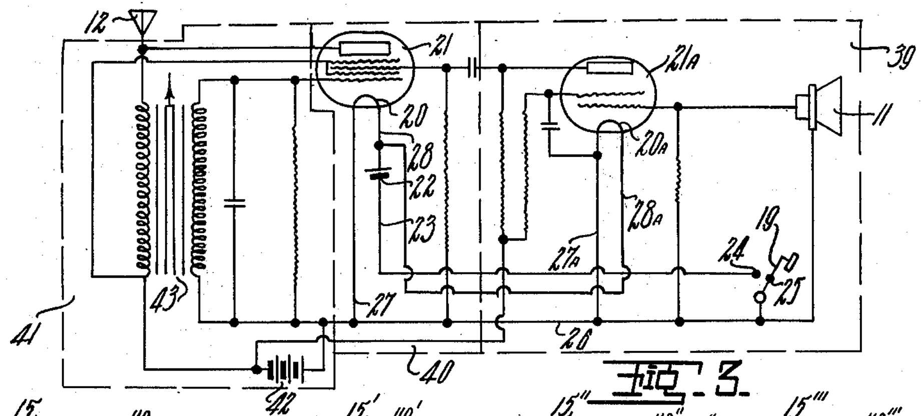
Fig. 3 is a wiring diagram of a sending station showing modifications therein over the sending station of Fig. 2.

In general the present invention contemplates a plurality of sending stations such as diagrammatically illustrated in Figs. 2 and 3 and indicated in Fig. 1 by the reference numerals 10, 10′, 10″ and 10‴ each being identical in its construction and operation. The transmitting stations 10, 10′, etc., are of the portable type and one is carried by each attendant between the places of his customers or patrons. The transmitters 10, 10′, etc., are each provided with a microphone 11 and an antenna 12. Cooperating with the several transmitters 10, 13′, 10″ and 10‴ are receivers 13, 13′, 13″ and 13‴ each of which is substantially identical with the other. The receivers 13, 13′, etc., are adapted to be fixedly mounted somewhere in the establishment and each receiver is equipped with a receiving antenna 14. Associated with each receiver is an interlock respectively indicated by reference numerals 15, 15′, 15″ and 15‴ for energizing or operating a signal, associated therewith, to show that it is in condition to be operated and to render inoperative the other receivers and their respective signals, said signals being illustrated in the drawing as lights and indicated by the numerals 16, 16′, 16″ and 16‴. Each of the receivers 13, 13′, 13″ and 13‴ is suitably connected by a wire, cable or the like, 17, 17′, 17″ and 17‴ with a single loudspeaker 18 at the order receiving point such as a kitchen, bar, counter, or the like.

Since the transmitters or sending stations 10, 10′, etc., are each substantially identical, it is deemed sufficient if but one of them be illustrated and described in detail with particular reference to Fig. 2. As there shown the transmitter is a compact unit of the single tube variety having the microphone 11 controlled by a manually operable switch 19 which completes, upon operation, a circuit to the filament or heater 20 of the tube 21 through an "A" battery 22; this heater circuit includes a wire 23 to a fixed contact 24 engageable by a movable contact 25 of the switch 19. The circuit from the switch contact 25 includes a wire 26 to a second wire 27 extending from one side of the tube, while a wire 28 from the other side of the heater or filament 20 extends to the other side of the "A" battery for thereby completing the filament or tube heater circuit.

The closing of the manually operable switch 19 in addition to closing contacts 24 and 25 also caused movable contact 29 to engage a fixed contact 30 thereby completing a circuit for energizing the microphone 11. This microphone circuit comprises a battery 31 from one side of which extends a wire 32 terminating in the microphone 11. Extending from the microphone 11 is a wire 33 that terminates in the fixed contact 30 so that the circuit, upon engagement therewith of the movable contact 29, continues through the switch 19, a wire 26, and a wire 35 to the secondary coil 36 of a transformer, indicated in its entirety by the reference numeral 37. The microphone circuit is completed by a wire 38 from the other end of the secondary coil 36 to the other side of the battery 31.

The transmitter or sending station 10 involves no particularly new mechanism but comprises, as readily understood, the usual sections such as the audio and modulation section enclosed in the dash line box 39, the filament heating section enclosed in the dash line box 40 and the radio frequency oscillator section enclosed in the dash line box 41. The radio frequency oscillator section includes the "B" battery 42 which has one side thereof connected to the primary coil of a transformer indicated in general by the reference numeral 43. The said transformer 43 terminates in the sending or transmitting antenna 12.

The modified transmitter in Fig. 3 is what is known as a crystal microphone which includes a pair of tubes 21 and 21A differing in characteristics as is well known. With this mechanism no microphone battery circuit is required wherefore the switch 19′ has but a single movable contact 25 to engage the fixed contact 24 for completing the "A" battery circuit to each of the two filaments or heating elements. The operation of the transmitter of Fig. 3 is identical with that of Fig. 2 and comprises the same sections of audio frequency modulation 39, filament heating section 40 and radio frequency oscillation 41.

The signals transmitted by the sending stations are, as noted above, picked up by their receivers, 13, 13′, 13″ or 13‴. As illustrated in Fig. 1, transmitter 10′ is broadcasting or sending a message indicated by the wavy line 44 to the receiver 13′. Since each of the receivers are substantially identical it is deemed sufficient if but one of them be described and illustrated.

Figure 4:
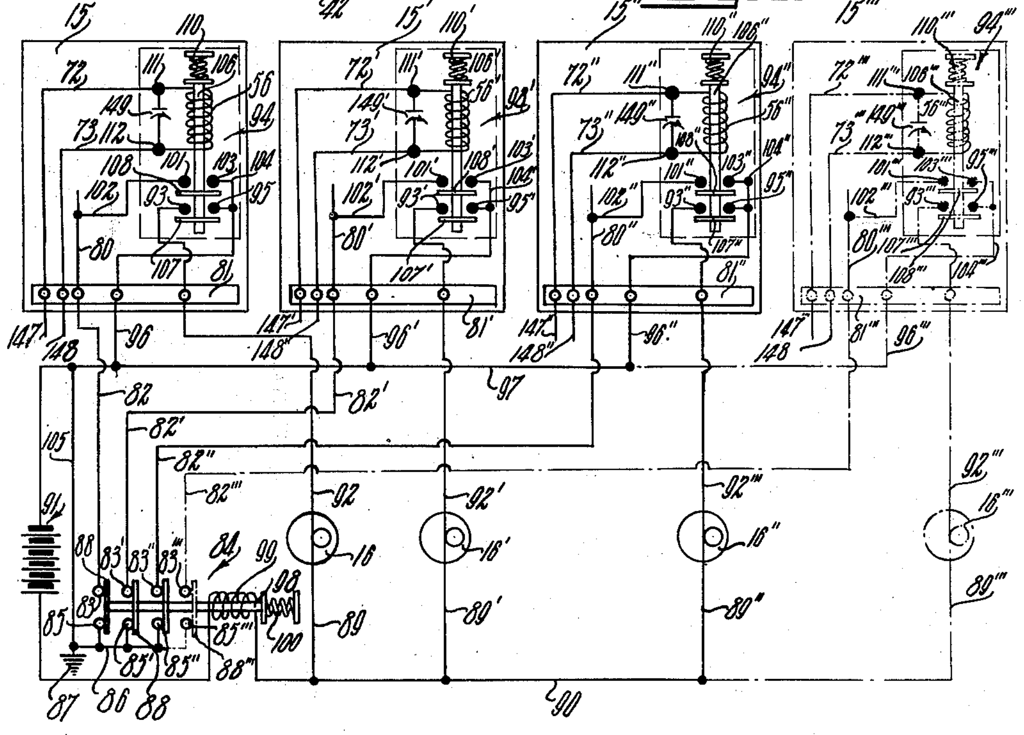
Fig. 4 is a wiring diagram of an interlock between the various receivers operable selectively and automatically upon the operation of a single sending station.
Figure 5:
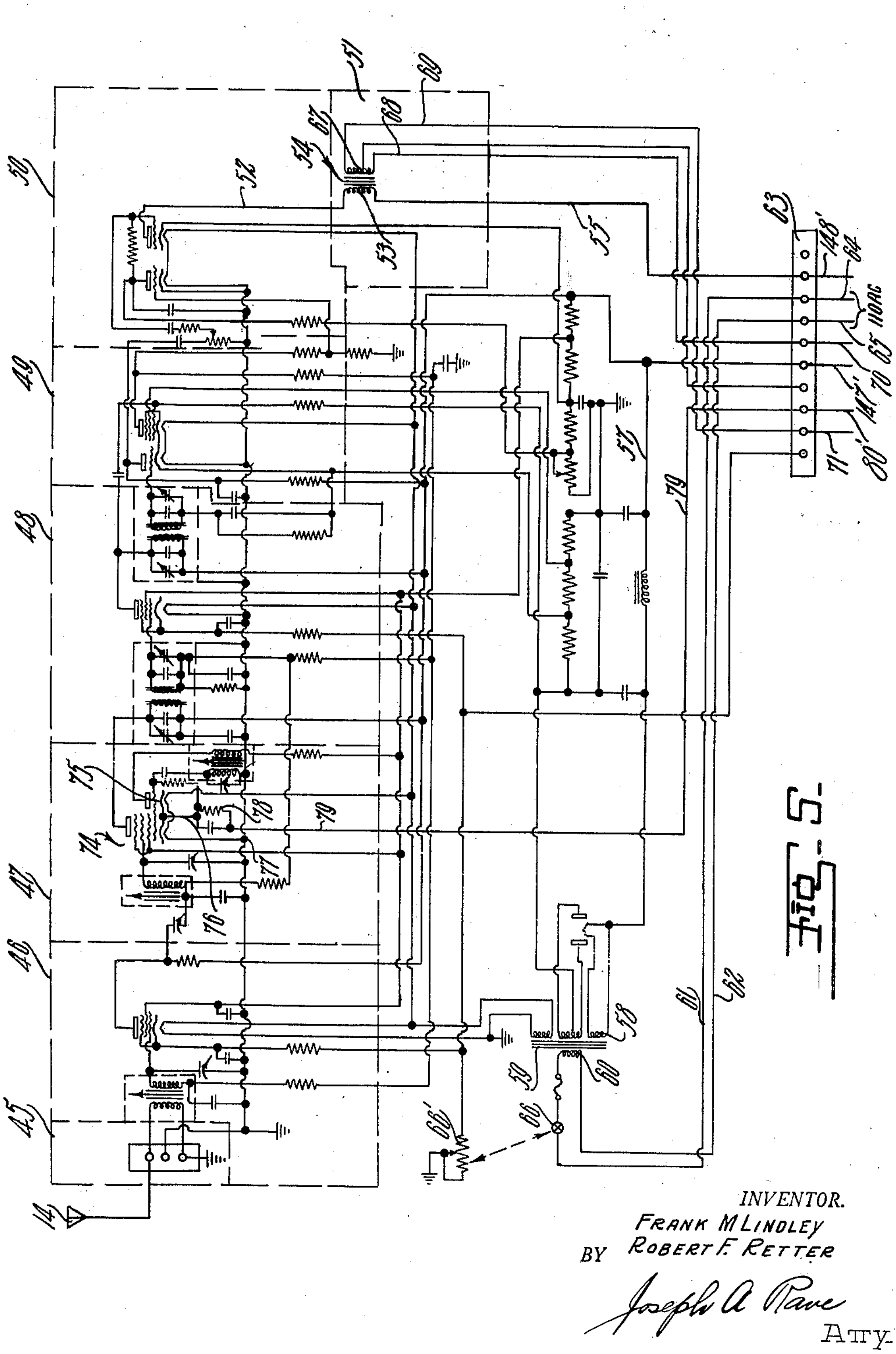
Fig. 5 is a wiring diagram of a receiver for a sending station there being a receiver for each sending station.

Accordingly, there is illustrated in Fig. 5 a receiving set which like the transmitter or sending station is divided up into standard sections. The receiver comprises the antenna connector section 45, the radio frequency amplifier section 46, the mixer and oscillator section 47, the intermediate frequency amplifier section 48, the detector section 49 and the audio frequency amplifier section 50. It is deemed unnecessary to further describe the radio circuits as they are standard and not limited to the particular elements shown in Fig. 4 since any receiver employing conventional circuits tuned to the frequency of its transmitter may be employed.

Each receiver beyond the audio frequency amplifier circuit is provided with an audio or loudspeaker section or circuit indicated by the reference numeral 51 for operating the loudspeaker 18, and it is in this circuit that the mechanism for operating the interlocks 15, 15′, etc., of the various receivers 13, 13′, etc., is located. The loudspeaker section or circuit 51 has entering therein a wire 52 from the plate of the radio tube of the audio frequency amplifier section or circuit and which wire 52 terminates at one end of the primary coil 53 of an output transformer, indicated in its entirety by the reference numeral 54. The output transformer primary coil 53 has its other end connected, in series, by a wire 55 to the solenoid coil 56′, see Fig. 4, of the interlock relay switch, as will presently be made clear, This relay switch may be positioned closely adjacent the output transformer 54 but for convenience in illustration and description is illustrated separately from the receiver circuit in Fig. 5 with said relay switch and parts associated therewith illustrated in Fig. 4. Accordingly, the wire 55 is illustrated as terminating in a terminal strip or plug 63 from which the connection to the relay switch is made. From the other end of the relay switch solenoid coil 56 is a wire that terminates in the terminal strip or plug 63 which continues therefrom as a wire 57 terminating in one end of secondary coil 58 of a power transformer indicated in its entirety by the reference numeral 59, and through which secondary coil 58 current is supplied to the said wire 52 and audio amplifier section or circuit radio tube plate.

The power transformer 59 has its primary coil 60 connected by wires 61 and 62 to the terminal plug 63 from which extends wires 64 and 65 to a commercial current source, for example, 110 volts alternating current. The wire 61 has therein the power switch 66, mechanically coupled with the sensitivity control 66', for the entire receiver. It should be noted that the power switch and sensitivity control may be and generally will be remote from the receiver.

The secondary coil 67 of the output transformer 54 has its ends connected by wires 68 and 69 to the terminal plug 63 from which extends wires 70 and 71 to the loudspeaker 18 and which wires 70 and 71 are indicated in Fig. 1 by the reference numeral 17'; similar wires from each of the other receiving sets or receivers to the loudspeaker being indicated by reference numerals 17, 17'' and 17''', as above pointed out.

The operation of the device of the present invention up to this point is substantially well known, and briefly is as follows:

A plurality of compact battery-powered radio transmitters 10, 10', etc., preferably portable, are employed, each of which has conventional circuits therein under the control of its own manually operated "push to talk" switch. The transmitters are of the short range one-way radio communication system type and each is adjusted or tuned to transmit on its own frequency with each transmitter transmitting on a frequency different from each of the others. It will be understood that there may be any number of transmitters depending upon the area being covered.

A radio receiver 13, 13', etc., is employed with each transmitter with said receivers each tuned to the frequency of its transmitter 10, 10', etc. Each of the said receivers employs conventional radio circuits which are maintained in readiness to receive a broadcast signal as soon as the transmitters are turned on by their "push to talk" switches. In other words, the mere closing of the "push to talk" switch 19 of any transmitter, providing no other receiver and transmitter is in use, immediately effects the broadcast of a radio signal that renders inoperative to receive a radio signal all other receivers, as will subsequently be made clear. As is customary in radio receivers the reception of a radio signal causes an increase in current flow therethrough, resulting in an increase in current flow in the wire 52 and therefore an increase of current flow in the solenoid coil 56' for operating the solenoid switch in the interlocks 15, 15', etc., between the several receivers 13, 13', etc., so that only the receiver receiving the transmitted signal will get into the loudspeaker 18 as will now be described.

Each of the interlocks 15, 15', etc., is substantially identical with one another and is operated from the radio receiver with which it is associated. In the radio receiver in Fig. 5, and as is customary with substantially all radio receivers, each, the radio frequency amplifying circuit 46, mixing and oscillating circuit 47, intermediate frequency amplifying circuit 48, detector circuit 49, and audio amplifying circuit 50 is provided with a radio tube that includes a cathode and a plate between which flows current during the operation of the receiver. Any one of these radio tubes may be employed in the operation of the interlocks of the receivers. As shown in the drawings, use is made of the radio tube 74 of mixer and oscillator section or circuit 47 in the operation of said interlocks. It is to be understood that each of the receivers 13, 13', etc., is similarly wired and equipped but that this description will be confined to describing but one of the interlock operating structures, namely, that illustrated in Fig. 5 for interlock 15'.

For this purpose the tube 74 has extending from its cathode 75 a wire 76 which through a bypass condenser 77 and resistor 78 connects with a wire 79 terminating in the terminal block 63. From the terminal block 63 is a wire 80' into the interlock 15'. The wire 80' terminates in a connector strip 81' of the interlock 15' from which extends a wire 82' to a fixed contact 83' of a multi-contact solenoid switch indicated in its entirety by the reference numeral 84.

Each of the other interlocks 15, 15'' and 15''' is likewise connected with its receiver each having a wire 80, 80'' and 80''' which terminates in its terminal block or connector strip 81, 81'' and 81''' in turn having a wire extending therefrom, 82, 82'' and 82''' respectively terminating in a fixed contact 83, 83'' and 83''' of the multi-contact solenoid switch 84. Each of the fixed contacts 83, 83', 83'' and 83''' has a companion fixed contact 85, 85', 85'' and 85''' which are connected in parallel by a wire 86 with the ground indicated at 87. From this it will follow that each of the receivers 13, 13', etc., is provided with a common ground connection which is maintained completed through the multi-solenoid switch through movable contacts 88, 88', 88'' and 88''' when the receivers are in readiness for operation but with no receiver receiving a signal.

Each of the interlocks 15, 15', etc., has associated therewith a signal 16, 16', etc., as noted above, and these signals are in the form of a light bulb each having one side of its filament connected by a wire 89, 89', 89'' and 89''' with a wire 90 that extends from one side of a power source shown in the drawings as a battery 91. Each of the signal lights 16, 16', etc., has the other side of its filament connected, respectively, by a wire 92, 92', 92'' and 92''' with a fixed contact 93, 93', 93'' and 93''' of the solenoid switch of its interlock 15, 15', etc., respectively, indicated in its entirety by the reference numerals 94, 94', 94'' and 94'''. A companion fixed contact 95, 95', 95'' and 95''' of the solenoid switches 94, 94', etc., is connected, respectively, by a wire 96, 96', 96'' and 96''' with a common wire 97 that terminates at the other side of the power source or battery 91.

The multi-contact solenoid switch 84 has the movable contacts 88, 88', etc., all mounted on a single movable member or stem 98 around which is formed the solenoid coil 99. The stem 98 is spring biased or yieldably urged to its closed position by the spring 100 which is the normal position for maintaining the receivers in readiness for operation at any and all times.

Each of the interlock solenoid switches 94, 94', etc., is, respectively, provided with a fixed contact 101, 101', 101'' and 101''' from each of which extends a wire 102, 102', 102'' and 102''' that terminates in the wire 80 from its receiver controlled radio tube, radio tube 74, for example, as pointed out above. Each of the interlock solenoid switches 94, 94', etc., has, respectively, a fixed contact 103, 103', 103'' and 103''' that respectively cooperates with the fixed contacts 101, 101', etc., and which companion contacts 103, 103', etc., each have, respectively, connected therewith one end of a wire 104, 104', 104'' and 104''' that respectively connect with wires 96, 96', etc., and therefore the common wire 97. The common wire 97 has connected therewith one end of a wire 105 that has its other end connected with wire 86 and therefore the ground 87.

Each of the solenoid switches 94, 94', etc., includes a movable member 106, 106', 106'' and 106''' which carry respectively movable switch contacts 107 and 108, 107' and 108', 107'' and 108'' and 107''' and 108''' the former connecting the fixed contacts 93 and 95, 93' and 95', etc., while the latter connects the fixed contacts 101 and 103, 101' and 103', etc. Associated with each of the movable members 106 and 106', etc., respectively, of the solenoid switches, 94, 94', etc., is the solenoid coil 56, 56', 56'' and 56''' for effecting the operation of said switches with said movable members 106 and 106', etc., being held in their normal open position, respectively, by a spring 110, 110', 110'' and 110'''. Each of the solenoid coils 56, 56', etc., respectively, has its ends connected to terminals 111 and 112, 111' and 112', 111'' and 112'' and 111''' and 112''' and to which terminals, respectively, extend wires 72 and 73, 72' and 73', 72'' and 73'' and 72''' and 73''' from the terminal strips or terminal plugs 81, 81', etc., of the several interlocks 15, 15', etc. The said wires 72 and 73, 72' and 73', etc., each extends, respectively, as a wire 147 and 148, 147' and 148', 147'' and 148'', and 147''' and 148''' that terminates in the terminal strip or terminal plug 63 of its receiver. The wire 147', see Fig. 5, is in effect a continuation of wire 57 from the power transformer secondary coil 58 while the wire 148' is in effect a continuation of the wire 53 from the output transformer primary coil 53. From this it will be seen, as noted above, that the primary coil 53 of output transformer 54 and the interlock solenoid switch coil 56 are in series with the output power transformer 59 and plate of the audio frequency amplifier section or circuit 50.

Continuing, now, with the description of the operation of the device and assuming that the transmitter 10' is in use this operation is as follows:

The increase flow of current in the output transformer primary coil 53 and solenoid switch coil 56' causes a sufficient flow of current through the circuit or wires 72' and 73' to energize the said solenoid switch coil 56' for actuating its movable element 106' against the resistance of the spring 110' thereby causing movable contacts 107' and 108' to complete the circuits, respectively, across fixed contacts 95' and 93' and 103' and 101'. The closing of the contacts 93' and 95' caused a completed circuit from one end or side of the power source or battery 91 through the wire 97, wire 96, fixed contact 95', movable contact 107', fixed contact 93', wire 92', filament of signal light 16', wire 89', wire 90 including the multi-contact solenoid switch solenoid coil 99 to the other end or side of the current source or battery 91. This resulted in the illumination of the signal light 16' and at the same time interrupted the common ground circuit to each of the receivers by opening fixed contacts 83 and 85, 83' and 85', etc., thereby disabling each of the receivers. However, at the time of closing the contacts 93' and 95', as noted above, the contacts 101' and 103' were closed thereby reestablishing the ground circuit for the cathode of radio tube 74 of radio receiver 13' as follows, from wire 80, Fig. 5, wire 80', Fig. 4, through wire 102', fixed contact 101', movable contact 108', fixed contact 103', wires 104' and 96', and wires 97 and 105 to the ground 87 wherefore the receiver 13' is maintained in operation so that the signal from the transmitter 10' will be delivered to the audio or loudspeaker 18 while any signal attempted from any one of the other transmitters 10, 10'' and 10''' will not be transmitted through its receiver to the audio or loudspeaker.

It will be noted in Fig. 1 that the sending station or transmitter 10''' and the receiver 13''' are illustrated in phantom lines and it will further be noted that the interlock 15''' in Fig. 4 is similarly illustrated in phantom lines. In Fig. 4, also, the fixed contacts 83''' and 85''' along with their cooperating movable contact 88''' of the multi-contact solenoid switch 84 are similarly shown in phantom lines. The reason for this is to illustrate that any number of receivers and interlocks may be employed it being merely necessary to add additional contacts, both movable and fixed, to the solenoid switch 84 for each additional receiver and its interlock. It is of course understood that a separate sending station or transmitter 10 will be required for each of the additional receivers with said transmitters or sending stations and receivers tuned to one another and differing from each other and those in use.

Connected across the terminals 111 and 112, 111' and 112', etc., of each of the solenoid switch coils 56, 56', etc., is an adjustable or variable condenser 149, 149', 149'' and 149''' which is employed as a timer for effecting a delay in the return of the solenoid switches 94, 94', etc., to their normal positions thereby preventing the disconnection of the radio receiver presently being used from the loudspeaker as, for example, should the user inadvertently open his "push to talk" transmitter switch and another user desiring to utilize his sending station or transmitter close his switch. In other words, this time delay is believed desirable to insure the user completing his use before someone else disconnects his receiver from the speaker and to safeguard against human error in the use of the system. It is understood that this time delay is relatively small in the matter of seconds in time.

Figures 6, 7, 8, 9:
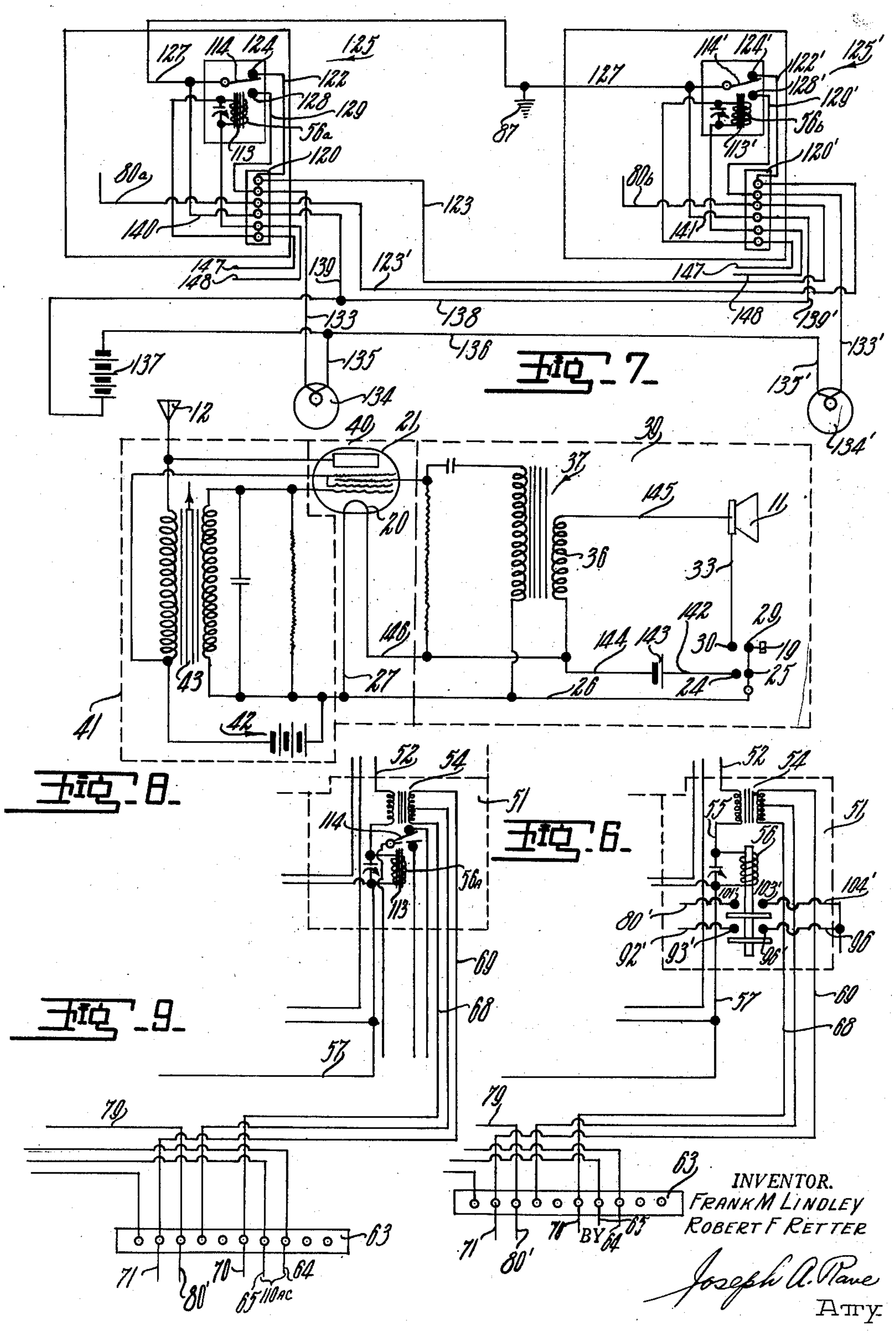
Fig. 6 is a wiring diagram of a portion of Fig. 5 showing a close connection between the receiver diagram of Figs. 4 and 5 instead of a remote relation as illustrated in said Figs. 4 and 5.
Fig. 7 is a wiring diagram of a pair of interlocks between two receivers and which is a modification of the invention over that disclosed in Fig. 4.
Fig. 8 is a wiring diagram of a sending or transmitting station in which use is made of but a single battery for energizing the microphone as well as operating the heater or filament of the tube.
Fig. 9 is a wiring diagram similar to Fig. 6 showing a close connection of the receiver diagram of Figs. 5 and 7 instead of the remote connection thereof of said Figs. 5 and 7.

The illustration in Fig. 6 discloses the method of closely connecting or coupling the interlock relay switch 94' with the receiver instead of having the same remote therefrom and connected with the receiver terminal strip or terminal plug. By this construction the wire 55 is connected directly with the solenoid coil 56' instead of to the terminal strip or terminal plug 63 and from there connected with the terminal strip or terminal plug 81' of the interlock. At the same time the other end of the solenoid coil 56' is directly connected with the wire 57 from the output transformer secondary coil 58, again instead of through the terminal strips or terminal plugs 81' and 63 as is fully obvious from Fig. 6.

In the modified interlock mechanism of Fig. 7 the multi-solenoid switch 84 has been eliminated utilizing instead the solenoid switch of the several interlocks for disabling the other receivers and for operating a signal to indicate the receiver that is in use. This particular arrangement is advantageous at such times when only two receivers are being employed wherefore the said interlocks are illustrated as employing but two devices, but it is to be understood that this modified arrangement may be employed with additional receivers.

In the modified interlocks of Fig. 7 single pole double throw switches 125 and 125′ are utilized instead of the double pole double throw switches 94, 94′, etc., of Fig. 4. In this construction each of the switch coils 56a and 56b is employed to energize, respectively, a magnet 113 and 113′, as is usual with single pole double throw switches. Each of the magnets 113 and 113′ is adapted to operate a movable switch contact or switch blade 114 and 114′ of its relay switch 125 and 125′, respectively. The switch blades 114 and 114′ are respectively movable between fixed contacts 124 and 128 and 124′ and 128′. The movable switch elements or switch blades 114 and 114′ are connected with one another by a wire 127 which in turn is connected with the ground 87.

The relay switch 125 has extending from its fixed contact 124 a wire 122 terminating in its terminal strip or terminal block 120 while the relay switch 125′ similarly has extending from its fixed contact 124′ a wire 122′ that terminates in its terminal strip or terminal plug 120′. Extending from the terminal strip or terminal plug 120, as a continuation of wire 122, is a wire 123 that terminates in the terminal strip or plug 120′ of the relay switch 125′. Extending from the terminal strip or terminal plug 120′ as a continuation of wire 123 is a wire 80b which is the wire 80 from the receiver of Fig. 5. The relay switch 125′ has extending from its terminal strip or terminal plug 120′, as an extension of the wire 122′, a wire 123′ that terminates in the terminal strip or terminal plug 120 of relay switch 125. From the terminal strip or terminal plug 120, as a continuation of wire 123′, is a wire 80a that goes to the first receiver as wire 80 in Fig. 5 while the wire 80b goes to the second receiver again as wire 80 in said Fig. 5.

With the parts in this position the radio tube 74 of the receivers each has its cathode connected through the interlock of the other receiver to the ground. This circuit being as follows, through wire 80, Fig. 5, wire 80a, Fig. 7, to the terminal strip or terminal plug 120 of the relay switch 125, wire 123′, terminal strip or terminal plug 120′, wire 122′, fixed contact 124′, movable contact 114′ and wire 127 to the ground 87. The radio tube 74 of the second receiver is similarly connected through the wire 80, Fig. 5, wire 80b, Fig. 7, to the terminal strip or terminal plug 120′, wire 123, terminal strip or terminal plug 120, wire 122, fixed contact 124, movable contact 114 and wire 127 to the ground 87.

From this it will be seen that actuation of the movable switch member or blade 114 or 114′ of the receiver being energized interrupts the ground connection of the other receiver thereby rendering said other receiver inoperative to receive signals.

The actuation of either of these movable contacts or switch blades 114 and 114′ automatically completes a circuit through the second contact of its interlock solenoid switch 125 and 125′ for lighting the signal of the receiver being used. To accomplish this the fixed contacts 128 and 128′, respectively, have extending therefrom a wire 129 and 129′ which terminate, respectively, in terminal strip or terminal block 120 and 120′. Extending from the terminal strips or terminal blocks 120 and 120′, respectively, as continuations, respectively, of wires 129 and 129′ are wires 133 and 133′ which terminate in one end of filaments of signals, respectively, 134 and 134′. The other ends of the filaments of signals 134 and 134′ have respectively connected therewith wires 135 and 135′ which terminate in a common wire 136 extending to one end or side of a power source or battery 137. The other side of the power source or battery 137 has extending therefrom a wire 138 from which extends wires 139 and 139′ respectively terminating in the terminal strip or terminal plug 120 and terminal strip or terminal plug 120′. Extending from the terminal strip or terminal plugs 120 and 120′, respectively, as continuations of wires 139 and 139′, respectively, are wires 140 and 141 which are connected to the movable switch elements or switch blades 114 and 114′, conveniently shown in the drawings as connected with the wire 127 ahead of the switch elements or switch blades 114 and 114′.

The operation of the interlocks of Fig. 7 is believed obvious from the foregoing description and the lighting or energizing of the signals 134 and 134′ is believed likewise obvious from Fig. 7. Specifically, the circuit for the signal light 134 is as follows, the circuit for the signal light 134′ being identical except for the addition to the reference numerals of a prime (′). The closing of the switch element or blade 114 with the fixed contact 128 causes a current flow from one side of the power source or battery 137 through wires 136 and 135, filament of signal light 134, wires 133 and 129, fixed contact 128, movable contact or switch blade 114, a portion of wire 127, and wires 140, 139 and 138 to the other side of the power source or battery 137.

The illustration in Fig. 9 discloses the close coupling of the modified interlocks of Fig. 7 with the receiver and which is accomplished in substantially the same manner as above described in connection with Fig. 6. The parts in Fig. 9 are identified by the same reference characters as illustrated in Fig. 7 wherefore it is believed no further description of Fig. 9 is necessary.

As was noted above, sending stations or portable microphones as heretofore known and used have considerable weight which is occasioned by the necessity of batteries in each of the circuits or by additional vacuum tubes and auxiliary equipment resulting in a device that may be quite tiring to the attendant in his transportation of same throughout the day. To overcome this difficulty use may be made of the transmitting station or microphone illustrated in Fig. 8 which, by comparison with Fig. 2, has eliminated therefrom the battery 22 with suitable connections for providing an operative structure.

Specifically, the mechanism of Fig. 8, as distinguished from that in Fig. 2, comprises a filament or heater 20 from one side of which extends a wire 27 that terminates in a wire 26 connected to the movable contacts 25 and 29 of the "push to talk" switch 19.

The switch movable contact 25 is adapted to engage the fixed contact 24 from which extends a wire 142 which terminates at its other end in the positive pole of a battery 143. The other side or negative pole of the battery 143 has connected therewith a wire 144 that terminates in one end of the secondary coil 36 of transformer 37. The other end of the secondary coil 36 has connected therewith one end of a wire 145 that terminates in the carbon microphone 11 and from which extends a wire 33 to a fixed switch contact 30 that cooperates with and is engaged by the movable contact 29 of the "push to talk" switch 19.

Connected with the wire 144 ahead of the secondary coil 36 of the transformer 37 is a wire 146 that terminates in the other end of the heater or filament 20 of tube 21.

From the foregoing, it will be noted that a single battery 143 of a capacity and size no greater than either of the batteries 22 and 31 is employed for energizing the microphone circuit and the tube heater or filament circuit. The microphone circuit comprises from one side of the battery 143 a wire 142, contacts 24 and 25, switch 19, contacts 29 and 30, wire 33, microphone 11, wire 145, transformer secondary coil 36 and wire 144 to the other side of the battery 143. The filament or heater circuit includes from one side of the battery 143 a wire 142, contacts 24 and 25, switch 19, wires 26 and 27, filament or heater 20, and wires 146 and 144 back to the other side of the battery 143.

In order that the sending station of Fig. 8 operate it is necessary that the positive side of the battery 143 be connected with the positive side of the filament 20 as well as the positive side of the microphone 11 so that satisfactory results be obtained.

From the foregoing, it is believed now evident that there has been provided a short range communications system utilizing standard radio equipment and in which a plurality of sending or broadcasting and receiving stations with a single audio or loudspeaker are employed with said receivers being interlocked so that when any one of them is in use the others are rendered inoperative whereby only the operating receiver has its signals connected with the audio or loudspeaker.

What is claimed is:

1. In a device of the class described the combination of a plurality of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with each of the other receiving stations and operable upon energization of its receiving station for rendering inoperative all of the other receiving stations, a signal light associated with each radio receiving station interlock and operable simultaneously therewith for indicating said receiving station is in operation, each of the radio receivers including a radio tube having a cathode element including a ground connection, each interlock forming a part of the ground connection of the cathode element of the radio tube, and means in said interlock operable for breaking the ground connection of the radio tube of each receiver except that of the receiver in operation.

2. In a device of the class described the combination of a plurality of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with each of the other receiving stations and operable upon energization of its receiving station for rendering inoperative all of the other receiving stations, a signal light associated with each radio receiving station interlock and operable simutaneously therewith for indicating said receiving station is in operation, each of the radio receivers including a radio tube having a cathode element including a ground connection, each interlock forming a part of the ground connection of the cathode element of the radio tube, and means in said interlock operable for breaking the ground connection of the radio tube of each receiver except that of the receiver in operation, comprising a solenoid operated switch for completing the ground connection of the radio tube of the receiver in operation simultaneously with the breaking of the said ground connection of the other receivers.

3. In a device of the class described the combination of a plurality of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with each of the other receiving stations and operable upon energization of its receiving station for rendering inoperative all of the other receiving stations, a signal light associated with each radio receiving station interlock and operable simultaneously therewith for indicating said receiving station is in operation, each of the radio receivers including a radio tube having a cathode element including a ground connection, each interlock forming a part of the ground connection of the cathode element of the radio tube, and means in said interlock operable for breaking the ground connection of the radio tube of each receiver except that of the receiver in operation, comprising a solenoid operated switch common to all of the receivers for normally maintaining their ground connections operable upon the energization of any one of the receivers for breaking the ground connection of all receivers, and a second solenoid switch operable by the energized receiver for re-establishing its ground connection.

4. In a device of the class described the combination of a plurality of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with each of the other receiving stations and operable upon energization of its receiving station for rendering inoperative all of the other receiving stations, each of the radio receivers including a radio tube having a cathode element including a ground connection, each interlock forming a part of the ground connection of the cathode element of the radio tube, and means in said interlock operable for breaking the ground connection of the radio tube of each receiver except that of the receiver in operation.

5. In a device of the class described the combination of a pair of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with the other receiving station and operable upon energization of its receiving station for rendering inoperative the other receiving station, each of the radio receivers including a radio tube having a cathode element including a common ground connection, the interlocks together forming a part of the common ground connection of the cathode elements of the radio tubes, and means in each of said interlocks operable for breaking the ground connection of the radio tube of the other receiver when its receiver is energized.

6. In a device of the class described the combination of a pair of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with the other receiving station and operable upon energization of its receiving station for rendering inoperative the other receiving station, each of the radio receivers including a radio tube having a cathode element including a common ground connection, the interlocks together forming a part of the common ground connection of the cathode elements of the radio tubes, and means in each of said interlocks operable for breaking the ground connection of the radio tube of the other receiver when its receiver is energized, and a signal light associated with each radio receiving station interlock and operable simultaneously therewith for indicating said receiving station is in operation.

7. In a device of the class described the combination of a pair of transportable radio sending stations each adapted to broadcast on a different radio frequency, a receiving station for each broadcasting station tuned to the radio frequency of its broadcasting station, a single loudspeaker connected with each of the receiving stations, an interlock associated with each receiving station connected with the other receiving station and operable upon energization of its receiving station for rendering inoperative the other receiving station, each of the radio receivers including a radio tube having a cathode element including a common ground connection, the interlocks together forming a part of the common ground connection of the cathode elements of the radio tubes, and means in each of said interlocks operable for breaking the ground connection of the radio tube of the other receiver when its receiver is energized, including a solenoid operated switch for breaking the common ground connection of the radio receiving stations and establishing a ground connection for its radio receiver upon energization thereof.

FRANK M. LINDLEY.
ROBERT F. RETTER.

REFERENCES CITED

The following references are of record in the file of this patent:

UNITED STATES PATENTS

| Number | Name | Date |
|---|---|---|
| 1,326,727 | Hammond | Dec. 30, 1919 |
| 1,356,488 | Compare | Oct. 19, 1920 |
| 1,934,211 | Schroter et al. | Nov. 7, 1933 |
| 2,081,625 | Goldsmith | May 25, 1937 |
| 2,158,516 | McIntosh | May 16, 1939 |
| 2,187,603 | Hall | Jan. 16, 1940 |
| 2,210,089 | Loughren | Aug. 6, 1940 |
| 2,214,101 | Cunning | Sept. 10, 1940 |
| 2,249,425 | Hansell | July 15, 1941 |
| 2,289,485 | Cover | July 14, 1942 |
| 2,290,992 | Peterson | July 28, 1942 |
| 2,292,222 | Haigis | Aug. 4, 1942 |
| 2,383,908 | Bowers | Aug. 28, 1945 |
| 2,454,022 | Yardeny | Nov. 16, 1948 |
| 2,458,558 | Bradley | Jan. 11, 1949 |
| 2,469,555 | Hitchcock | May 10, 1949 |